US012488756B2

(12) United States Patent
Jang et al.

(10) Patent No.: US 12,488,756 B2
(45) Date of Patent: Dec. 2, 2025

(54) PIXEL CIRCUIT AND DISPLAY DEVICE INCLUDING THE SAME

(71) Applicant: LG Display Co., Ltd., Seoul (KR)

(72) Inventors: Hyung Uk Jang, Paju-si (KR); Jung Hoon Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/942,042

(22) Filed: Nov. 8, 2024

(65) Prior Publication Data

US 2025/0209984 A1 Jun. 26, 2025

(51) Int. Cl.

*G09G 3/20* (2006.01)
*G09G 3/32* (2016.01)
*G09G 3/3233* (2016.01)
*G09G 3/34* (2006.01)

(52) U.S. Cl.

CPC ............. *G09G 3/3233* (2013.01); *G09G 3/32* (2013.01); *G09G 3/3406* (2013.01); *G09G 2300/0426* (2013.01); *G09G 2300/0819* (2013.01); *G09G 2300/0852* (2013.01); *G09G 2320/0233* (2013.01); *G09G 2320/045* (2013.01); *G09G 2320/0626* (2013.01); *G09G 2320/0673* (2013.01); *G09G 2330/021* (2013.01)

(58) Field of Classification Search

CPC ...... G09G 3/3233; G09G 3/32; G09G 3/3406; G09G 2300/0426; G09G 2300/0819; G09G 2300/0852; G09G 2320/0233; G09G 2320/045; G09G 2320/0626; G09G 2320/0673; G09G 2330/021

See application file for complete search history.

(56) References Cited

U.S. PATENT DOCUMENTS 11,069,309 B2 * 7/2021 Sultenfuss ........... G09G 3/3406
12,008,958 B2 * 6/2024 Suzuki ..................... G09G 5/10
12,008,968 B2 6/2024 Hong
2014/0139419 A1 * 5/2014 Zhang .................. G09G 3/3406 345/102
2015/0161949 A1 * 6/2015 Wang ................... G09G 3/3406 315/307
2016/0167367 A1 * 6/2016 Takagi ................. B41J 2/04581 347/10
2018/0005357 A1 * 1/2018 Lasserre .................. H04N 5/57

(Continued)

FOREIGN PATENT DOCUMENTS

KR 10-2020-0011165 A 2/2020
KR 10-2023-0103287 A 7/2023

*Primary Examiner* — Ke Xiao
*Assistant Examiner* — Jennifer L Zubajlo
(74) *Attorney, Agent, or Firm* — Fenwick & West LLP

(57) ABSTRACT

A pixel circuit and a display device including the same are disclosed. The pixel circuit includes a driving element configured to regulate a current flowing to a light-emitting element according to its gate-source voltage; and a boosting circuit electrically connected to the driving element. The driving element includes a first electrode, a gate electrode, and a second electrode. The boosting circuit supplies a current to the first electrode of the driving element in each of a first mode and a second mode, and a peak current supplied to the first electrode of the driving element during the second mode is greater than a peak current supplied to the first electrode of the driving element during the first mode.

20 Claims, 12 Drawing Sheets

(56) References Cited

U.S. PATENT DOCUMENTS

| | | | | |
|---|---|---|---|---|
| 2018/0061320 | A1* | 3/2018 | Kim | G09G 3/3241 |
| 2018/0255225 | A1* | 9/2018 | Yu | H04N 9/646 |
| 2018/0336846 | A1* | 11/2018 | Lee | G09G 3/3406 |
| 2019/0035340 | A1* | 1/2019 | Sultenfuss | G09G 3/36 |
| 2019/0172379 | A1* | 6/2019 | Park | H02M 1/32 |
| 2019/0295504 | A1* | 9/2019 | Xiong | G09G 5/10 |
| 2020/0193890 | A1* | 6/2020 | Tichelaar | G09G 3/2003 |
| 2021/0134222 | A1* | 5/2021 | Ding | G09G 3/3258 |
| 2021/0343243 | A1* | 11/2021 | Takahashi | G09G 3/3233 |
| 2022/0223104 | A1* | 7/2022 | Sun | G09G 3/2003 |
| 2022/0335908 | A1* | 10/2022 | Rajagopalan | G09G 3/3426 |
| 2023/0012381 | A1* | 1/2023 | Lee | G09G 3/3266 |
| 2023/0069447 | A1* | 3/2023 | Kang | G09G 3/32 |
| 2023/0091644 | A1* | 3/2023 | Charisoulis | G09G 3/2074<br>345/694 |
| 2023/0169930 | A1* | 6/2023 | Pytlarz | G09G 5/02 |
| 2023/0215387 | A1* | 7/2023 | Hong | G09G 3/3233<br>345/204 |

* cited by examiner

PIXEL CIRCUIT AND DISPLAY DEVICE INCLUDING THE SAME

CROSS-REFERENCE TO RELATED APPLICATION

This application claims priority to and the benefit of Republic of Korea Patent Application No. 10-2023-0190879, filed on Dec. 26, 2023, which is hereby incorporated by reference in its entirety.

TECHNICAL FIELD

The present disclosure relates to a pixel circuit and a display device including the same.

BACKGROUND

A flat panel display device includes a liquid crystal display (LCD), an electroluminescence display, a field emission display, a plasma display panel, and the like. The electroluminescent display may be divided into an inorganic light-emitting display and an organic light-emitting display according to the material of a light emission layer.

In recent years, point light sources using a light-emitting diode (LED) may be used as the backlight light sources of a liquid crystal display (LCD) to precisely implement local dimming.

While organic light-emitting diodes (OLED) require a separate encapsulation layer to protect organic materials from moisture, micro-LEDs require no encapsulation layer, are faster to light up, and have better light efficiency and impact resistance than the OLEDs.

External light that is reflected from a display panel may cause a deterioration in the visibility of an image being reproduced. To overcome this, it is necessary to drive the pixels at a high luminance. However, driving the pixels at a high luminance increases the dynamic range of the data voltage applied to the pixels, which increases power consumption and reduces the voltage margin required for external compensation.

SUMMARY

The present disclosure aims to solve the above-described necessity and/or problems.

The present disclosure provides a pixel circuit capable of driving pixels at a high luminance without increasing a dynamic range of a data voltage and securing a sufficient compensation margin voltage, and a display device including the same.

The problem to be solved by the present disclosure is not limited to those mentioned above, and other problems not mentioned will be clearly understood by those skilled in the art from the following description.

In one embodiment, a pixel circuit comprises: a light-emitting element; a driving element connected to the light-emitting element and configured to regulate a current flowing to the light-emitting element according to a gate-source voltage of the driving element, the driving element including a first electrode, a gate electrode, and a second electrode; and a boosting circuit electrically connected to the driving element, the boosting circuit configured to supply the current to the first electrode of the driving element in each of a first mode and a second mode, wherein a first peak of the current supplied to the first electrode of the driving element in the second mode is greater than a second peak of the current supplied to the first electrode of the driving element in the first mode.

In one embodiment, a display device comprises: a plurality of pixels, each of the plurality of pixels including: a light-emitting element; a driving element that is electrically connected to the light-emitting element and configured to control a current flowing to the light-emitting element, the driving element including a first electrode, a gate electrode, and a second electrode; and a boosting circuit electrically connected to the first electrode of the driving element, the boosting circuit including: a first switch element including a first electrode connected to a first node to which a first input voltage is applied, a gate electrode connected to a third node, and a second electrode connected to the first electrode of the driving element; a second switch element electrically connected to a second node to which a second input voltage is applied and electrically connected to the first switch element at the third node, the second switch element configured to supply the second input voltage to the third node responsive to a first selection signal; and a first capacitor connected to a node to which a first boosting signal is applied and is electrically connected to the gate electrode of the first switch element at the third node, wherein during a first mode of the display device the first boosting signal is a first boost voltage and a magnitude of the current supplied to the first electrode of the driving element is a first value and during a second mode of the display device the first boosting signal is a second boost voltage that is greater than the first boost voltage and the magnitude of the current supplied to the first electrode of the driving element is a second value that is greater than the first value.

According to the present disclosure, the pixels may be driven at a high luminance without increasing the dynamic range of the data voltages output from the data driving circuit in the HDR mode by embedding a boosting circuit in each of the pixels. Accordingly, the present disclosure enables the display device to be driven at low power, and the compensation margin voltage for compensating the electrical characteristics of the transistor may be sufficiently secured within the output voltage range of the data driving circuit.

According to the present disclosure, the dynamic range of the HDR mode may be set to be the same as the dynamic range of the SDR mode in the output voltage range of the data driving circuit, resulting in the compensation margin voltage being sufficiently secured to extend the lifetime of the display device without deteriorating image quality.

The threshold voltage sensing of the driving element and the pixel data writing to the pixels may be separated in time to ensure sufficient time for the threshold voltage sensing, which may accurately compensate for the threshold voltage of the driving element and improve luminance uniformity across the screen.

According to the present disclosure, it is possible to prevent the error components from being charged in the main node of the pixel circuit by separating the capacitor for storing the threshold voltage of the driving device and the capacitor for storing the data voltage.

According to the present disclosure, the difference in luminance of the pixels may be minimized or at least reduced when the driving frequencies of the pixels change as the refresh rate varies by setting an anode reset voltage separately from the reference voltage.

According to the present disclosure, the low power driving of the display device may be implemented by setting the anode reset voltage separately from the reference voltage so that the cathode voltage may be set to 0 V.

According to the present disclosure, the level shifter and the gate driver may be shared in the driving circuit of a display panel in which different pixels are designed. For example, one shift register and four edge triggers may be used to output pulses of the first to fifth gate signals in the present disclosure, and may be shared with other pixel circuits.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1A:
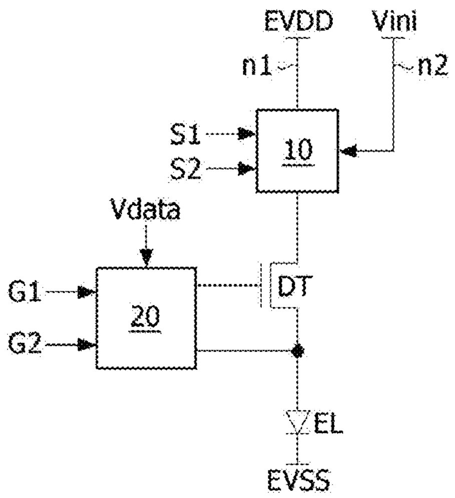
FIGS. 1A and 1B are drawings illustrating a pixel circuit according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," and "having" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit and the gate drive circuit of the display device may include a plurality of transistors. The transistor may be implemented as a thin film transistor (TFT). The transistors may be implemented as an oxide thin film transistor (TFT) including an oxide semiconductor, a low temperature poly silicon TFT (LTPS TFT) including a low temperature poly silicon, and the like.

Hereinafter, the pixel circuit may represent at least one of a display pixel circuit of a display panel that visually reproduces an input image and a local dimming pixel circuit that drives a light source irradiating light to the display panel. Data written to the pixel circuit may be pixel data written to the display pixel circuit or local dimming data written to the local dimming pixel circuit.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

Figure 1B:
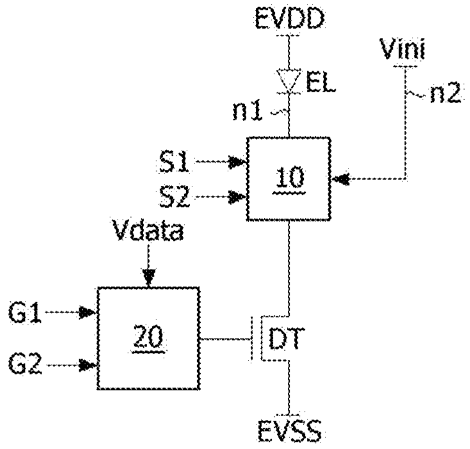

FIGS. 1A and 1B are drawings illustrating a pixel circuit according to one embodiment of the present disclosure.

Referring to FIGS. 1A and 1*i*, the pixel circuit includes a light-emitting element EL, a driving element DT for driving the light-emitting element EL, and a boosting circuit 10. The pixel circuit may further include a compensation circuit 20 that is electrically connected to the driving element DT. The boosting circuit 10 and the compensation circuit 20 may include a plurality of switch elements. The switch elements of the boosting circuit 10 and the compensation circuit 20, and the driving element DT may be implemented as transistors.

The boosting circuit 10 receives a first input voltage, a second input voltage Vini, a selection signal S1, and a boosting signal S2, and selectively raises the voltage applied to the driving element DT to drive the pixel at a high luminance. The first input voltage may be a pixel driving voltage EVDD as illustrated in FIG. 1A, or a voltage input through a turned-on light-emitting element EL as illustrated in FIG. 1B. The first input voltage may be a constant voltage supplied to the boosting circuit 10 through a first node n1 of the boosting circuit 10, and the second input voltage Vini may be a constant voltage supplied to the boosting circuit 10 through a second node n2 of the boosting circuit 10. The boosting circuit 10 may include a plurality of switch elements and a capacitor.

The boosting circuit 10 drives the pixel in a standard dynamic range (SDR) in a first mode (hereinafter referred to as "SDR mode"). The boosting circuit 10 may drive the pixel in a high dynamic range (HDR) in a second mode (hereinafter referred to as "HDR mode"). The boosting circuit 10 supplies a current to a first electrode of the driving element DT in each of SDR mode and HDR mode. The boosting circuit 10 may cause a first peak of the current supplied to the first electrode of the driving element DT in HDR mode to be greater than a second peak of the current supplied to the first electrode of the driving element in SDR mode. That is, a magnitude of the current supplied to the first electrode of the driving element DT during the HDR mode is a second value that is greater than a first value of the magnitude of the current that is supplied to the first electrode of the driving element DT during the SDR mode.

The boosting circuit 10 may include a plurality of switch elements and a capacitor, which are electrically connected to the driving element DT. The compensation circuit 20 may receive a data voltage Vdata of pixel data, gate signals G1, G2, and apply the data voltage Vdata of pixel data to a gate electrode of the driving element DT. The boosting circuit 10 may be implemented as an external compensation circuit and/or an internal compensation circuit. The external compensation circuit senses the electrical characteristic of the driving device DT, such as threshold voltage and mobility thereof, and modulates the pixel data (digital data) of an input image by the amount of the deviation (or change) in the electrical characteristic of the driving device DT to compensate for the deviation (or change) in the electrical characteristic of the driving device DT in real time at each pixel. The internal compensation circuit samples a threshold voltage of the driving device DT embedded in each of the pixel circuits of the sub-pixels for each sub-pixel and compensates for the gate-source voltage of the driving device DT by this threshold voltage.

The light-emitting element EL may be implemented as, but is not limited to, an organic light-emitting diode (OLED), micro-LED, mini LED, etc. The light-emitting element EL may include an anode electrode, a cathode electrode, and a light emission layer formed between the electrodes.

As illustrated in FIG. 1A, the anode electrode of the light-emitting element EL is electrically connected to a second electrode of the driving element DT, and a cathode voltage EVSS may be applied to the cathode electrode thereof. As illustrated in FIG. 1B, the pixel driving voltage EVDD is applied to the anode electrode of the light-emitting element EL, and the cathode electrode of the light-emitting element EL may be electrically connected to the boosting circuit 10 through the first node n1.

The driving element DT includes the first electrode connected to the boosting circuit 10, a gate electrode connected to the compensation circuit 20, and a second electrode. The driving element DT drives the light-emitting element EL by regulating a current required for driving the light-emitting element EL by its gate-source voltage. The gate-source voltage of the driving element DT is varied with a data voltage Vdata. Thus, the pixel may be emitted at a luminance that corresponds to a grayscale value of the pixel data.

Figure 2:
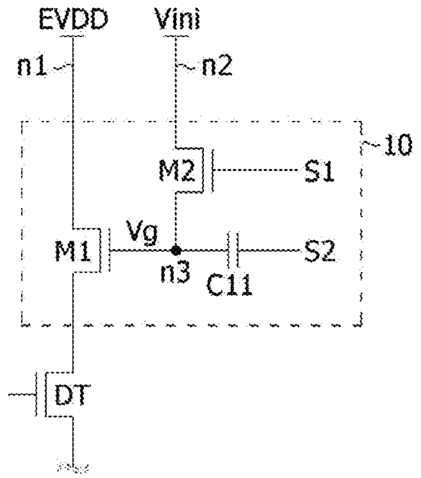
FIG. 2 is a circuit diagram illustrating a boosting circuit according to one embodiment of the present disclosure.
Figure 3:
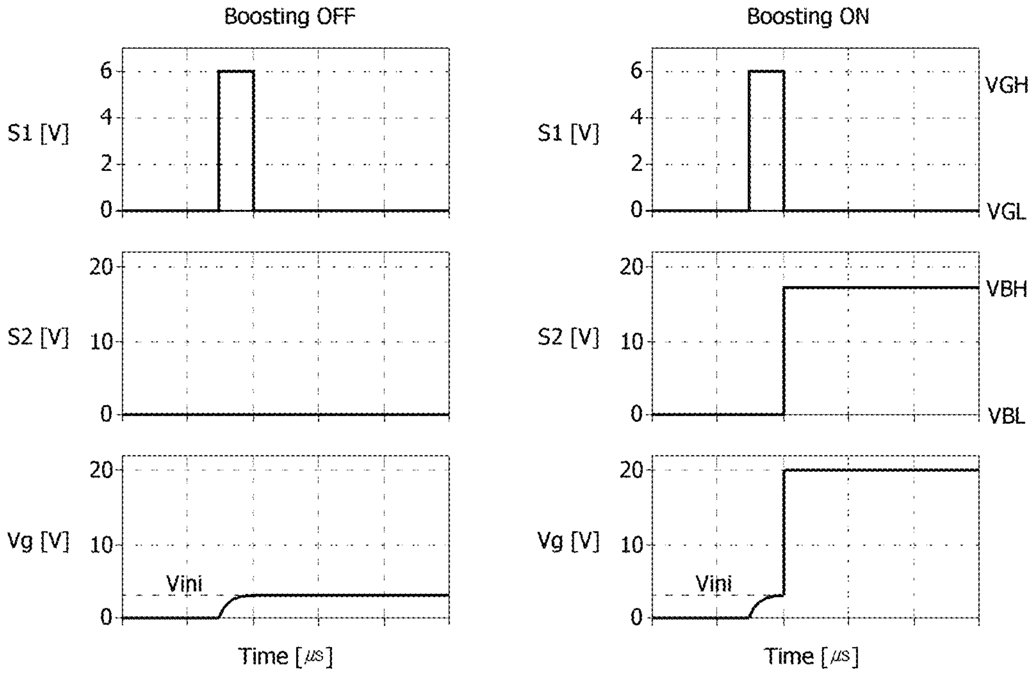
FIG. 3 is a waveform diagram illustrating the operation of the boost circuit shown in FIG. 2 in a standard dynamic range (SDR) mode and a high-dynamic range (HDR) mode according to one embodiment of the present disclosure.

FIG. 2 is a circuit diagram illustrating a boosting circuit according to one embodiment of the present disclosure. FIG. 3 is a waveform diagram illustrating the operation of the boosting circuit illustrated in FIG. 2 in the SDR mode and the HDR mode according to one embodiment of the present disclosure. In FIG. 3, 'VGH' is a gate-on voltage and 'VGL' is a gate-off voltage. 'VBH' is a boost high voltage and 'VBL' is a boost low voltage.

Referring to FIGS. 2 and 3, the boosting circuit 10 includes a first switch element M1, a second switch element M2, and a capacitor C11 according to one embodiment. The switch elements M1 and M2 may be implemented as, but are not limited to, n-channel transistors.

A first electrode of the first switch element M1 is connected to a first node n1 and a second electrode of the first switch element M1 is connected to the first electrode of the drive element DT. The gate electrode of the first switch element M1 is connected to the capacitor C11 and the second electrode of the second switch element M2 at node n3. The first switch element M1 is turned on in response to the gate-on voltage VGH of a selection signal S1 being received at the gate electrode of the first switch element M1. When the first switch element M1 is turned on, the first switch element M1 supplies a voltage to the first electrode of the drive element DT. In the HDR mode, a gate voltage Vg of the first switch element M1 may be boosted to increase the amount of source-drain current of the first switch element M1, thereby increasing the voltage applied to the driving element DT. The first switch element M1 includes the first electrode connected to the first node n1, the gate electrode connected to a third node n3, and the second electrode connected to the first electrode of the drive element DT.

The second switch element M2 includes a first electrode that is connected to a second node n2 and a second electrode that is connected to the gate electrode of the first switch element M1 and the capacitor C11 at the third node n3. The second switch element M2 is turned on in response to the gate electrode receiving the gate-on voltage VGH of the selection signal S1. When the second switch element M2 is turned on, the second input voltage Vini input to the second node n2 is applied to the third node n3. The second switch element M2 includes the first electrode connected to the second node n2, the gate electrode to which the selection signal S1 is applied, and the second electrode connected to the third node n3.

The capacitor C11 is a coupling capacitor that is connected to a node to which a boosting signal S2 is applied and the third node n3 to transfer the voltage of the boosting signal S2 to the gate electrode of the first switch element M1 at the third node n3. The voltage of the boosting signal S2 may be a pulse voltage that swings between the boost high voltage VBH and the boost low voltage VBL. When the boost high voltage VBH is applied to the third node n3, the gate voltage Vg of the first switch element M1 may be boosted so that the voltage applied to the gate electrode of the first switch element M1 may be as high as Vini+(VBH−VBL), as shown in Table 1 below.

The gate voltage Vg applied to the third node n3 may be controlled as shown in Table 1 below. In Table 1, "Boosting OFF" is the SDR mode and "Boosting ON" is the HDR mode.

The gate voltage Vg of the first switch element M1 is a voltage Vini in the SDR mode, whereas the gate voltage Vg of the first switch element M1 is increased to a voltage Vini+(VBH−VBL) in the HDR mode. Therefore, the boosting circuit may control the peak current flowing through the first switch element M1, thereby increasing the luminance of the pixel in HDR mode more than in the SDR mode. When the amount of current flowing through the first switch element M1 increases, the voltage applied to the first electrode of the driving element DT increases, and the amount of current flowing through the light-emitting element EL also increases, which may increase the luminance of the light-emitting element EL.

TABLE 1

| | Vg |
|---|---|
| Boosting OFF | Vini |
| Boosting ON | Vini + (VBH-VBL) |

Figure 4:
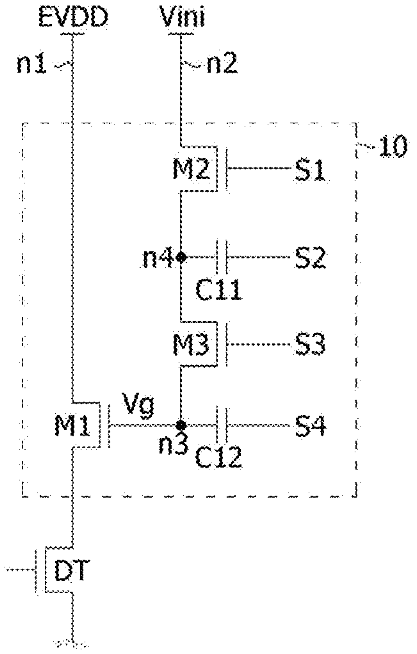
FIG. 4 is a circuit diagram illustrating a boost circuit according to another embodiment of the present disclosure.
Figure 5A:
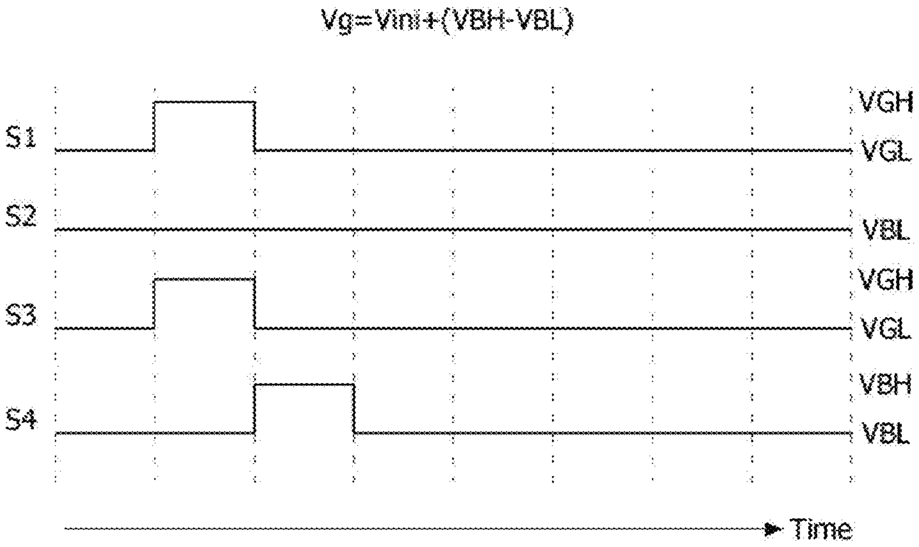
FIGS. 5A to 5B are wave forms illustrating the operation of the boost circuit shown in FIG. 4 in a HDR mode according to one embodiment of the present disclosure.
Figure 5B:
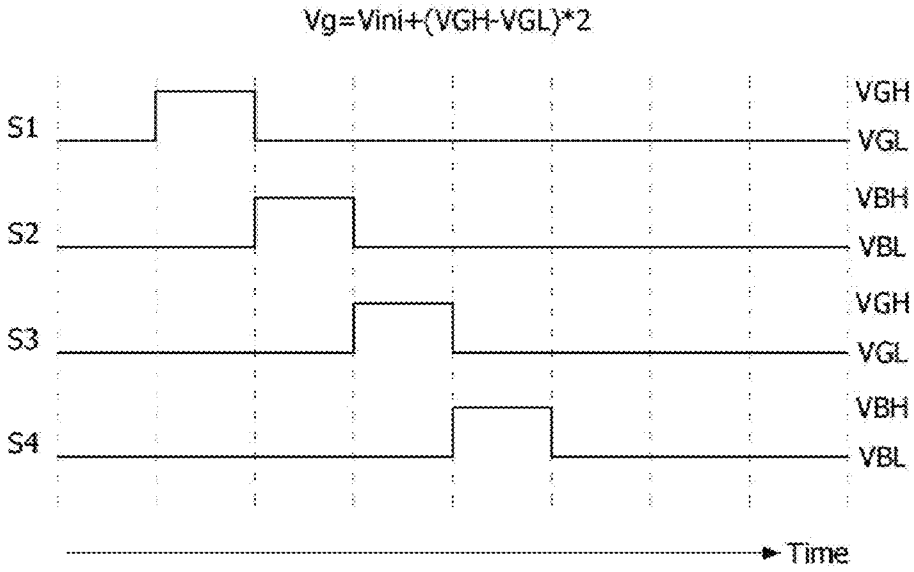

Referring to FIG. 3, the voltage of the selection signal S1 may be generated as a pulse that swings between the gate-on voltage VGH and the gate-off voltage VGL in the SDR mode (Boosting OFF) and the HDR mode (Boosting ON), respectively. The voltage of the boosting signal S2 may be the boost low voltage VBL in the SDR mode (Boosting OFF), and may be generated as a boost high voltage VBH in the HDR mode (Boosting ON), which is higher than the boost low voltage VBL, after the pulse of the selection signal S1 is decreased to the gate-off voltage VGL. The gate voltage Vg of the first switch element M1 is equal to the second input voltage Vini in SDR mode (Boosting OFF), whereas in the HDR mode, it is boosted to a voltage Vg=Vini+(VBH−VBL) higher than Vini. FIG. 3 shows the voltages set in the simulation, which are set to, but not limited to, VGH=6V, VGL=0V, VBH=17V, VBL=0V, and Vini=3V. FIG. 4 is a circuit diagram illustrating a boosting circuit according to another embodiment of the present disclosure. FIGS. 5A and 5B are waveform diagrams illustrating the operation of the boosting circuit illustrated in FIG. 4 in the HDR mode according to one embodiment of the present disclosure.

Referring to FIGS. 4 to 5B, the boosting circuit 10 includes a first switch element M1, a second switch element M2, a third switch element M3, a first capacitor C11, and a second capacitor C12. The switch elements M1, M2, and M3 may be implemented as n-channel transistors, but are not limited thereto.

The first switch element M1 includes a first electrode connected to the first node n1, a gate electrode connected to a third node n3, and a second electrode connected to the first electrode of the drive element DT.

The second switch element M2 is connected to a second node n2 and a fourth node n4 and is turned on in response to the gate-on voltage VGH of a selection signal S1. When the second switch element M2 is turned on, a second input voltage Vini input to the second node n2 is applied to the fourth node n4. The second switch element M2 includes a first electrode connected to the second node n2, a gate electrode to which the selection signal S1 is applied, and a second electrode connected to the fourth node n4.

The first capacitor C11 is a coupling capacitor that is connected to a node to which a boosting signal S2 is applied and the fourth node n4 to transfer the voltage of the boosting signal S2 to the fourth node n4. In the HDR mode, the voltage of the boosting signal S2 is applied as the boost high voltage VBH to boost the voltage of the fourth node n4.

The third switch element M3 is connected to the third node n3 and the fourth node n4 and is turned on in response to the gate-on voltage VGH of a second selection signal S3. When the third switch element M3 is turned on, the voltage of the fourth node n4 is applied to the third node n3. The third switch element M3 includes a first electrode connected to the fourth node n4, a gate electrode to which the second selection signal S3 is applied, and a second electrode connected to the third node n3.

The second capacitor C12 is a coupling capacitor that is connected between a node to which a second boosting signal S4 is applied and the third node n3 to transfer the voltage of the second boosting signal S4 to the third node n3. In the HDR mode, the voltage of the second boosting signal S4 is applied as the boost high voltage VBH to boost the voltage of the third node n3.

FIG. 5A shows an example in which the boosting circuit 10 boosts the gate voltage Vg with only primary boosting.

Referring to FIG. 5A, the second and third switch elements M2 and M3 are turned on in response to the gate-on voltage VGH of the first and second selection signals S1 and S3, and the gate voltage Vg applied to the third node n3 is boosted to Vg=Vini+(VBH−VBL) when the second boosting signal S4 is the boost high voltage VBH. After the pulses of the first and second selection signals S1 and S3 are generated simultaneously to turn on the second and third switch elements M2 and M3 simultaneously, the voltage of the second boosting signal S4 may be increased to the boost high voltage VBH. When the boosting circuit 10 operates with only primary boosting, the voltage of the boosting signal S2 is the boost low voltage VBL.

FIG. 5B shows an example in which the boosting circuit 10 further increases the gate voltage Vg by primary boosting and secondary boosting.

Referring to FIG. 5B, the second switch element M2 is turned on in response to the gate-on voltage VGH of the selection signal S1, causing the voltage of the fourth node n4 to be boosted, which occurs when the boosting signal S2 is the boost high voltage VBH.

Subsequently, the third switch element M3 is turned on in response to the gate-on voltage VGH of the second selection signal S3, causing the voltage of the second boosting signal S4 to be increased to the boost high voltage VBH. In this case, the gate voltage Vg applied to the third node n3 may be boosted to Vg=Vini+(VBH−VBL)*2.

Figure 6:
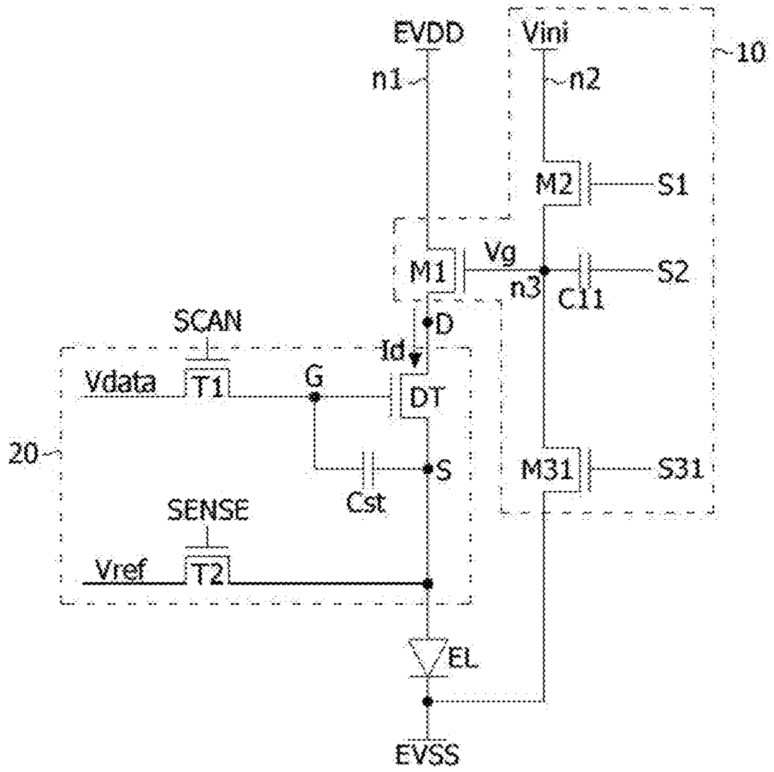
FIG. 6 is a circuit diagram illustrating a pixel circuit according to one embodiment of the present disclosure.
Figure 7:
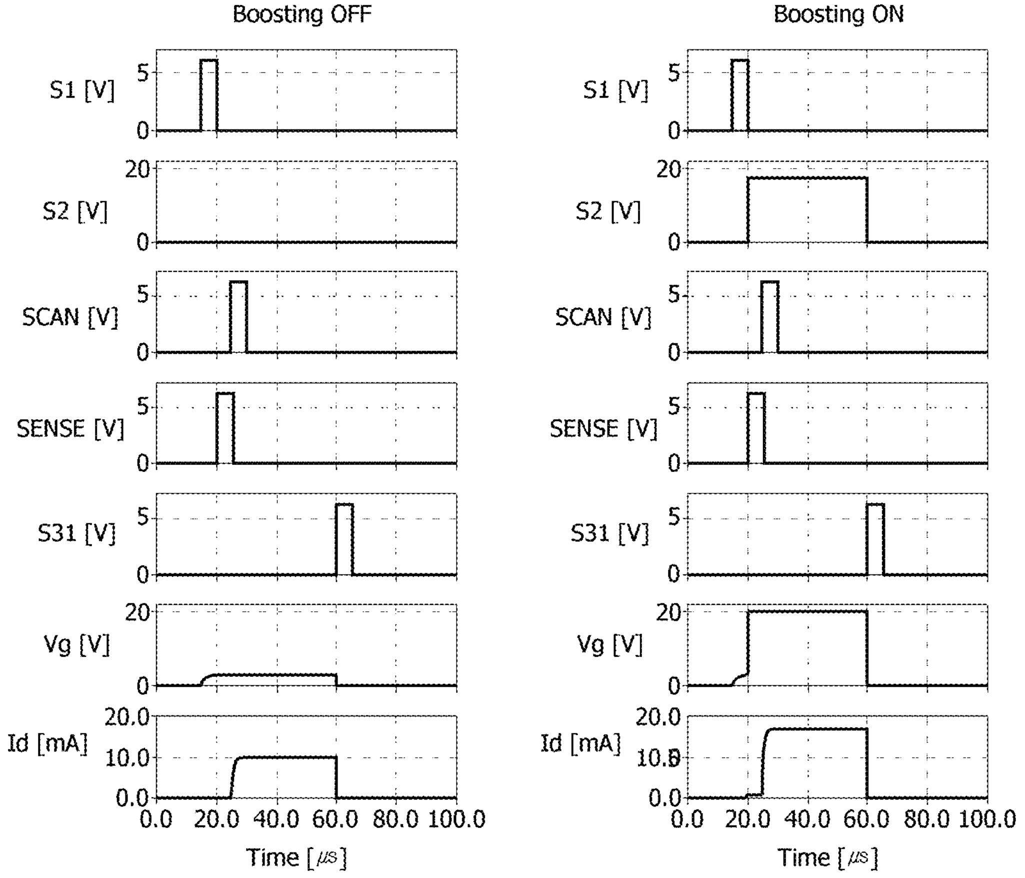
FIG. 7 is a waveform diagram illustrating the operation of the boost circuit shown in FIG. 6 in a SDR mode and a HDR mode according to one embodiment of the present disclosure.

FIG. 6 is a circuit diagram illustrating a pixel circuit according to one embodiment of the present disclosure. FIG. 7 is a waveform diagram illustrating the operation of the boosting circuit illustrated in FIG. 6 in the SDR mode and the HDR mode according to one embodiment of the present disclosure.

Referring to FIGS. 6 and 7, the pixel circuit includes a light-emitting element EL, a driving element DT for driving the light-emitting element EL, a boosting circuit 10, and a compensation circuit 20. The boosting circuit 10 and the compensation circuit 20 may include a plurality of switch elements M1, M2, M31 and T1, T2. The switch elements M1, M2, M31, T1, and T2 of the boosting circuit 10 and the compensation circuit 20, and the driving element DT may be implemented as n-channel transistors, but are not limited thereto.

The pixel circuit is connected to a data line DL to which a data voltage Vdata is applied and gate lines to which gate signals SCAN, SENSE and selection signals S1, S31 are applied. The gate SCAN and SENSE may include a first gate signal SCAN and a second gate signal SENSE. The pixel circuit is connected to constant voltage nodes to which direct current voltages (or constant voltages) are applied, such as a VDD node (first constant voltage node) to which the pixel driving voltage EVDD is applied, a VSS node (second constant voltage node) to which the cathode voltage is applied, and a REF node (third constant voltage node) to which a reference voltage Vref is applied. The constant voltage nodes are connected to power lines disposed on the display panel, and the power lines may be commonly connected to all of the pixels.

The dynamic range of the data voltage Vdata may be set to be the same in SDR mode and HDR mode. For example, the data voltage Vdata may have a dynamic range of 0 to 18 V in the SDR mode and in the HDR mode. The data voltage Vdata may be a voltage selected according to the grayscale value of the pixel data. The reference voltage Vref may be a voltage selected from a voltage range of 1 to 3 V. The pixel driving voltage EVDD may be a voltage selected from a voltage range between 15 and 20V, and the cathode voltage EVSS may be 0V, but are not limited thereto. The gate-on voltage VGH of the gate signals SCAN, SENSE and the selection signal S1 may be set to 24 V, and their gate-off voltage VGL may be set to −12V, but are not limited thereto. The second input voltage Vini may be 3 to 12 V. The boost high voltage VBH and the boost low voltage VBL of the boosting signal S2 may be selected between 0 and 17 V. In one example, the boost high voltage VBH may be selected from a voltage between 5 and 12 V, and the boost low voltage VBL may be selected from a voltage between 0 and 5 V. These voltages are not limited to those shown in the figures above.

The driving element DT includes a first electrode connected to a first pixel node D, a gate electrode connected to a second pixel node G, and a second electrode connected to a third pixel node S. The light-emitting element EL includes an anode electrode connected to the third pixel node S and a cathode electrode connected to the VSS node to which the cathode voltage EVSS is applied.

The boosting circuit 10 may include a first switch element M1, a second switch element M2, and a capacitor C11. The boosting circuit 10 may be implemented as the multi-boosting circuit illustrated in FIG. 4. The boosting circuit 10 may further include a reset switch element M31.

The reset switch element M31 is connected to the third node n3 and the VSS node, and may be turned on in response to the gate-on voltage VGH of a reset signal S31 and turned off in response to the gate-off voltage VGL of the reset signal S31. When the reset switch element M31 is turned on, the third node n3 may be electrically connected to the VSS node so that the gate voltage Vg of the third node n3 may be reset, as illustrated in FIG. 7.

The compensation circuit 20 may include a first pixel switch element T1, a second pixel switch element T2, and a storage capacitor Cst.

The first pixel switch element T1 is connected between a data line to which the data voltage Vdata is applied and the second pixel node G and is turned on in response to the gate-on voltage VGH of the first gate signal SCAN. When the first pixel switch element T1 is turned on, the data voltage Vdata is applied to the second pixel node G. The first pixel switch element T1 includes a first electrode connected to the data line, a second electrode connected to the second pixel node G, and a gate electrode connected to a gate line to which the first gate signal SCAN is applied.

The second pixel switch element T2 is connected to the REF node to which the reference voltage Vref is applied and the third pixel node S, and is turned on in response to the gate-on voltage VGH of the second gate signal SENSE. When the second pixel switch element T2 is turned on, the reference voltage Vref is applied to the third pixel node S. The second pixel switch element T2 includes a first electrode connected to the REF node, a second electrode connected to the third pixel node S, and a gate electrode connected to a gate line to which the second gate signal SENSE is applied.

The storage capacitor Cst is connected to the second pixel node G and the third pixel node S to charge the gate-source voltage of the driving element DT.

In the HDR mode (Boosting ON), the gate voltage Vg of the first switch element M1 is boosted to increase the drain current (Id) of the driving element DT, as illustrated in FIG. 7.

Therefore, in the HDR mode (Boosting ON), the amount of current flowing to the light-emitting element EL is increased in comparison to the SDR mode so that the light-emitting element EL may emit at a high luminance.

Figure 8:
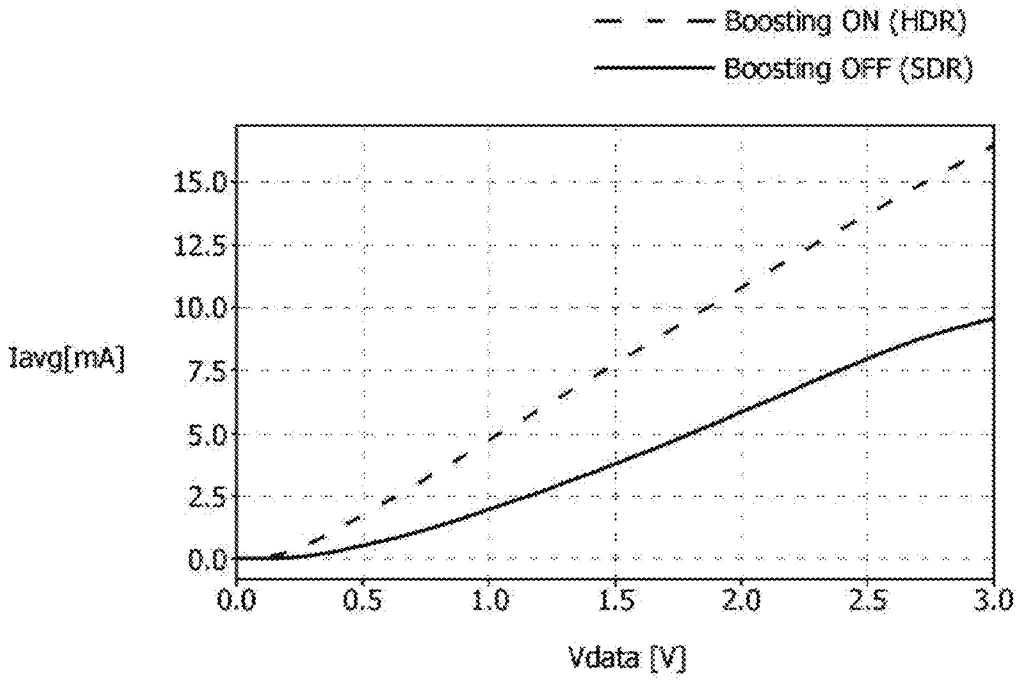
FIG. 8 is a diagram illustrating a simulation result for verifying the boosting effect of the pixel circuit shown in FIG. 7 according to one embodiment of the present disclosure.

FIG. 8 is a diagram illustrating a simulation result for verifying the boosting effect of the pixel circuit illustrated in FIG. 7. In FIG. 8, the abscissa is the data voltage (Vdata[V]) and the ordinate is the average current (Iavg) of the drain current (Id) supplied to the driving element DT through the first switch element M1. This simulation conditions are as follows: EVDD=15 V, Vini=3 V, Vref=0 V, Vdata=0~3 V, S1=6 V, SCAN=6 V, SENSE=6 V, S2=17 V, C11=Cst=1 Nf, resistance (R) of VDD node=100Ω, channel width (W) of transistors DT and M1 is 2001 μm, channel length (L) of transistors DT and M1 is 10 m. As shown in FIG. 8, in this simulation, the current (Iavg) flowing through the first switch element M1 was found to be higher in the HDR mode than in the SDR mode.

Figure 9:
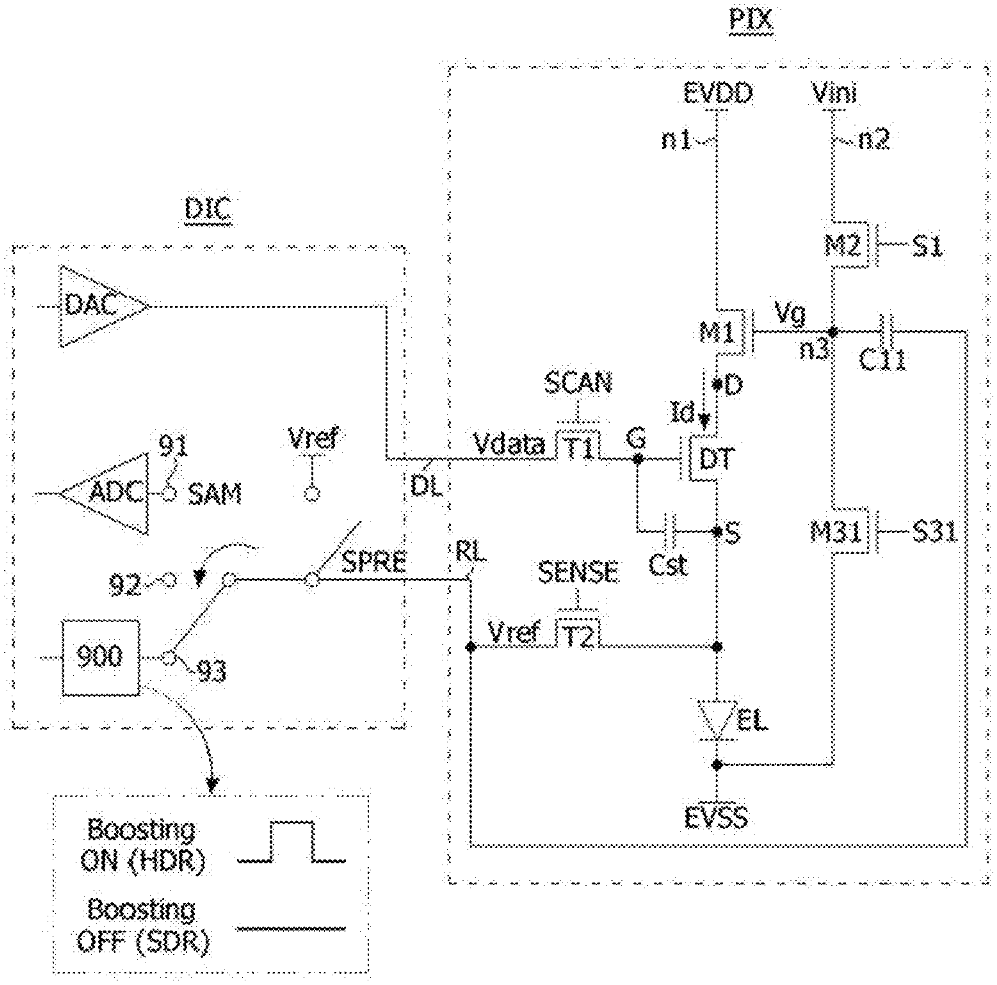
FIG. 9 is a circuit diagram illustrating a pixel circuit according to another embodiment of the present disclosure.

FIG. 9 is a circuit diagram illustrating a pixel circuit according to another embodiment of the present disclosure. In this embodiment, the components that are substantially the same as in the preceding embodiments are designated with the same reference numerals and are not described in detail. A pixel circuit PIX may be substantially the same as the circuit illustrated in FIG. 6.

Referring to FIG. 9, the first switch element T1 of the pixel circuit PIX is connected to a data line DL, and the second switch element T2 is connected to a reference voltage line RL to which the reference voltage Vref is applied.

The present disclosure may include a digital-to-analog converter (DAC) that converts pixel data or local dimming data input as a digital signal into the data voltage Vdata in a display mode and outputs it, an analog-to-digital converter (ADC) that converts a voltage charged on a reference voltage line RL into digital data and outputs it, a boosting voltage generator 900, a sampling switch element SAM, and a reference voltage switch element SPRE. The DAC, ADC, sampling switch element SAM, and reference voltage switch element SPRE may be embedded in a drive IC (DIC) in which a data driver is integrated.

The boosting voltage generator 900 is a circuit that may be implemented as a level shifter that converts the voltage level of the digital signal into the boost high voltage VBH and the boost low voltage VBL, or it may be implemented as a digital-to-analog converter (DAC) that converts the digital signal into an analog voltage. The digital signal input to the boosting voltage generator 900 may include a data value indicating a voltage level for each of the boost high voltage VBH and the boost low voltage VBL. This digital signal may originate from the controllers 130 and 500 illustrated in FIGS. 12 and 13. The boosting voltage generator 900 may be embedded in the drive IC (DIC) or disposed external to the drive IC and electrically connected to the pixel circuit PIX through the sampling switch element SAM. The sampling switch element SAM and the reference voltage switch element SPRE may be turned on/off under the control of the controller.

A sensing circuit of the external compensation circuit may include the ADC, the sampling switch element SAM, and the reference voltage switch element SPRE to sense the threshold voltage of the driving element DT in a sensing mode. The sensing mode may be activated during at least one of the following sequences: a Power ON sequence where power is applied to the display device, a Vertical Blank time within a display time, and a Power OFF sequence where the display device's power off switch is turned on.

In the sensing mode, the second switch element T2 and the reference voltage switch element SPRE of the pixel circuit PIX are turned on to apply the reference voltage Vref to the reference voltage line RL. At this point, the sampling switch element SAM connects the reference voltage line RL to a floating node 92. Subsequently, when the sampling switch element SAM is connected to an input node 91 of the ADC, the voltage of the third pixel node D is input to the ADC through the reference voltage line RL so that the threshold voltage of the driving element DT may be sensed.

The display mode may be divided into the HDR mode and the SDR mode. In the display mode, the data voltage Vdata is applied to the second pixel node G through the first pixel switch element T1, and the boosting signal S2 output from the boosting voltage generator 900 is applied to the capacitor C11 through the reference voltage line RL. At this time, the sampling switch element SAM may connect the reference voltage line RL to an output node 93 of the boosting voltage generator 900, and the second pixel switch element T2 may be turned off. In the HDR mode, the voltage of the boosting signal S2 may be increased to the boost high voltage VBH. In the SDR mode, the voltage of the boosting signal S2 may be maintained at the boost low voltage VBL.

Figure 10:
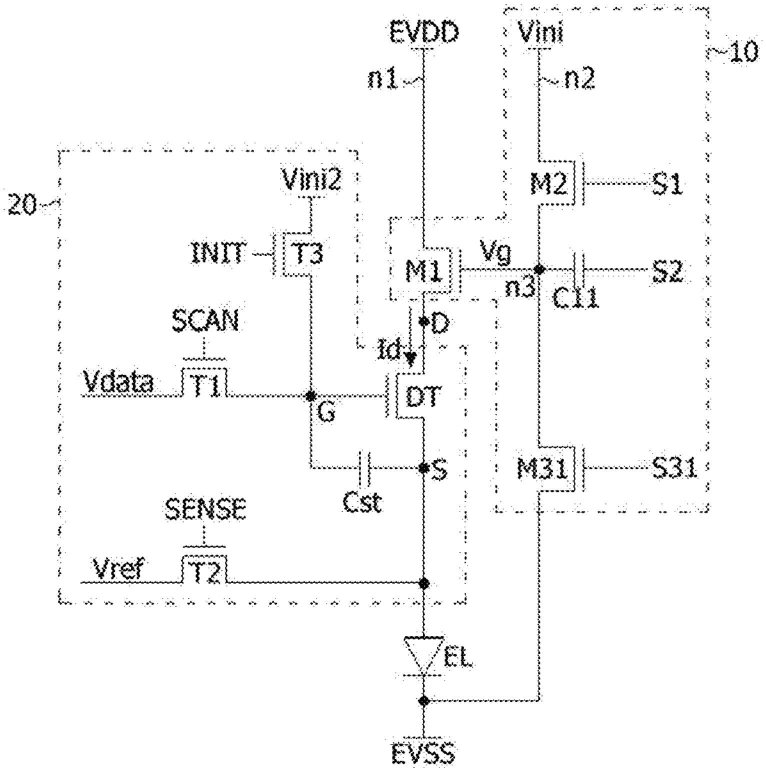
FIG. 10 is a circuit diagram illustrating a pixel circuit according to further another embodiment of the present disclosure.
Figure 11:
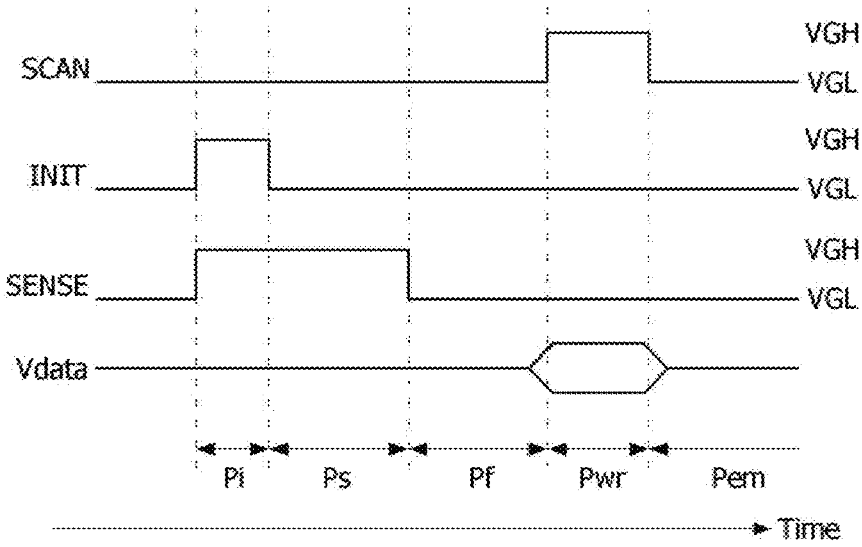
FIG. 11 is a waveform diagram illustrating a gate signal and a data voltage applied to the pixel circuit illustrated in FIG. 10 according to one embodiment of the present disclosure.

FIG. 10 is a circuit diagram illustrating a pixel circuit according to another embodiment of the present disclosure. In this embodiment, the components that are substantially the same as in the preceding embodiments are designated with the same reference numerals and are not described in detail. Although the pixel circuit illustrated in FIG. 2 has been applied to the boosting circuit 10 in FIG. 10, the boosting circuit 10 may be implemented as the boosting circuit illustrated in FIG. 4. FIG. 11 is a waveform diagram illustrating a gate signal and a data voltage applied to the pixel circuit illustrated in FIG. 10.

Referring to FIGS. 10 and 11, the compensation circuit 20 may include a first pixel switch element T1, a second pixel switch element T2, a third pixel switch element T3, and a capacitor Cst.

The third pixel switch element T3 is connected between a constant voltage node to which an initialization voltage Vini2 is applied and the second pixel node G and is turned on in response to the gate-on voltage VGH of a third gate signal INIT. When the third pixel switch element T3 is turned on, the initialization voltage Vini2 is applied to the second pixel node G. The initialization voltage Vini2 may be set, but not limited to, a voltage between 3 and 12 V.

The pixel circuit may be driven by an initialization phase, a threshold voltage sampling phase, a floating sensing phase, a data writing phase, and a light emission phase. The initialization phase is performed during a first period Pi. During the first period Pi, the third pixel switch element T3 is turned on in response to the gate-on voltage VGH of the third gate signal INIT, and the second pixel switch element T2 is turned on in response to the gate-on voltage VGH of the second gate signal SENSE. During the first period Pi, the driving element DT may be turned on.

The threshold voltage sampling phase and the floating phase are performed during second and third periods Ps and Pf. During the second period Ps, the second pixel switch element T2 remains in the on-state. During the second period Ps, when the voltage of the third pixel node S rises and the gate-source voltage of the driving element DT is lower than the threshold voltage of the driving element DT, the driving element DT is turned off so that the voltage of the third node S may be sensed through the REF node and the reference voltage line RL. The gate signals SCAN, SENSE, and INIT are the gate-off voltages VGL during the third period Pf. During the third period Pf, the first to third pixel switch elements T1, T2, and T3 are in the off-state, and therefore the second and third pixel nodes G and S are floating.

The data writing phase is performed during a fourth period Pwr. During the fourth period Pwr, the first switch element T1 is turned on in response to the gate-on voltage VGH of the first gate signal SCAN synchronized with the data voltage Vdata. During the fourth period Pwr, the data voltage Vdata may be applied to the second pixel node G, and thus the gate-source voltage of the driving element DT for driving the light-emitting element EL may be set according to the data voltage Vdata. In this case, the mobility (μ)

of the drive element DT may be compensated. For example, when the mobility of the driving element DT is large within the fourth period Pwr, the voltage of the third pixel node S increases, which reduces the gate-source voltage of the driving element DT. On the contrary, when the mobility of the driving element DT is relatively small, the voltage of the third node S is reduced, which increases the gate-source voltage Vgs of the driving element DT. The light emission phase is performed during a fifth period Pem. During the fifth period Pem, the light-emitting element EL may be emitted by a current generated according to the gate-source voltage of the driving element DT. In the HDR mode, during the fourth period Pwr or the fifth period Pem, a drain current of the driving element DT may be increased by the boosting circuit 10 to increase the luminance of the light-emitting element EL.

Figure 12:
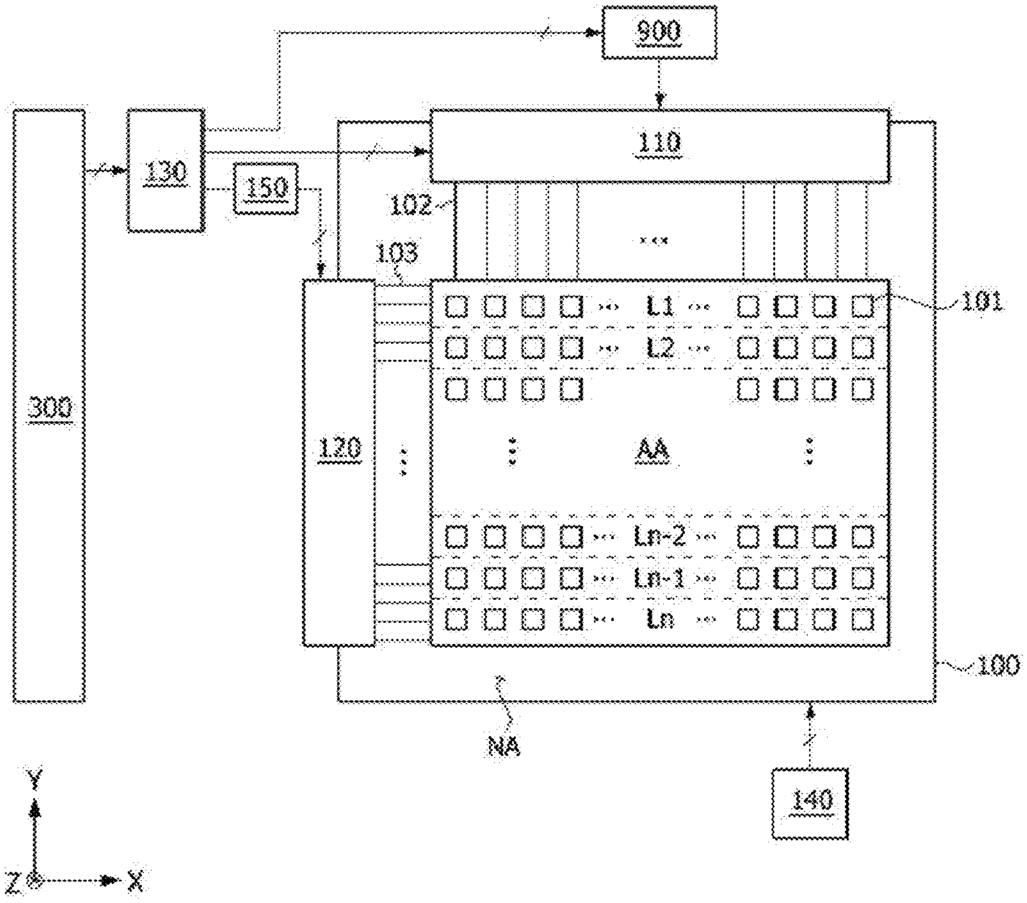
FIG. 12 is a block diagram illustrating a display device according to one embodiment of the present disclosure.

FIG. 12 is a block diagram illustrating a display device according to one embodiment of the present disclosure.

Referring to FIG. 12, the display device includes a display panel 100 and a display panel driving circuit for writing pixel data to display pixels 101 of the display panel 100. The display device further includes a power supply 140.

The display panel 100 may be, but is not limited to, a panel having a rectangular structure with a length in the X-axis direction, a width in the Y-axis direction, and a thickness in the Z-axis direction. For example, the display panel 100 may be a deformed panel that is at least partially curved or elliptical.

A display area AA of the display panel 100 includes a pixel array for displaying an input image thereon. The pixel array includes a plurality of data lines 102, a plurality of gate lines 103 intersecting the data lines 102, and a plurality of display pixels 101. The display panel 100 may further include power lines commonly connected to the display pixels 101. The power lines may be commonly connected to pixel circuits and supply voltages required for driving the display pixels 101 to the display pixels 101.

Each of the display pixels 101 is connected to a corresponding data line 102, a plurality of gate lines 103, and power lines. The constant voltages such as the pixel driving voltage EVDD, the cathode voltage EVSS, the second input voltage Vini, the reference voltage Vref, and the initialization voltage Vini2 may be supplied to the display pixels 101 through the power lines. The gate lines may include a first gate line to which the first gate signal SCAN is applied, a second gate line to which the second gate signal SENSE is applied, a third gate line to which the third gate signal INIT is applied, a fourth gate line to which the selection signal S1 is applied, and a fifth gate line to which the second selection signal S3 is applied. Some of the gate signals and selection signals may be omitted depending on the embodiments of the pixel circuits described above.

Each of the display pixels 101 may be divided into a red sub-pixel, a green sub-pixel, and a blue sub-pixel for color implementation. Each of the display pixels 101 may further include a white sub-pixel. Each of the sub-pixels includes a display pixel circuit for driving a light-emitting element. The display pixel circuit may be implemented as any one of the pixel circuits illustrated in FIGS. 1 to 9.

The display array AA includes a plurality of display pixel lines L1 to Ln. Each of the display pixel lines L1 to Ln includes one line of display pixels 101 arranged in the display area AA of the display panel 100 along a gate line direction (X-axis direction). The display pixels 101 disposed in one pixel line may share the gate line 103. The sub-pixels arranged in the column direction (Y-axis direction) along the data line direction share the same data line 102. One horizontal period is a time obtained by dividing one frame period by the total number of pixel lines L1 to Ln.

The display panel 100 may be implemented as a non-transmissive display panel or a transmissive display panel. The transmissive display panel may be applied to a transparent display device in which an image is displayed on a screen and an actual object is visible beyond the display panel. The display panel 100 may be made as a flexible display panel that may be flexibly bent.

The power supply 140 receives an input voltage provided from a host system 300 and outputs the voltages required to drive the display pixels 101 of the display panel 100 and the display panel driving circuit. To this end, the power supply 140 may include a direct current to direct current converter (DC-DC converter). The DC-DC converter may include a charge pump, a regulator, a buck converter, a boost converter, and the like. The power supply 140 may output the constant voltages (or direct current voltages), such as the gate-on voltage VHG, the gate-off voltage VGL, the pixel driving voltage EVDD, the cathode voltage EVSS, an IC driving voltage for the display panel driving circuit, and the like through the DC-DC converter. The gate-on voltage VGH and the gate-off voltage VGL are supplied to a level shifter 150 and a gate driver 120.

The power supply 140 may further include a gamma voltage generator. The gamma voltage generator receives a high potential reference voltage and a low potential reference voltage and outputs a plurality of gamma reference voltages divided by a predetermined voltage interval on a preset gamma curve, for example, 2.2 gamma curve. The gamma reference voltages are supplied to the data driver 110. In the data driver 110, the gamma reference voltages are divided by a voltage division circuit and subdivided into grayscale voltages. The gamma voltage generator may be implemented as a programmable gamma circuit capable of adjusting each of the gamma reference voltages according to digital data. A controller 130 or the host system 300 or a separate external device may update digital data stored in registers of a programmable gamma circuit through a communication interface.

The display panel driving circuit writes the pixel data of the input image to the display pixels 101 of the display panel 100 under the control of the controller 130. The display panel driving circuit includes the data driver 110, the gate driver 120, the boosting voltage generator 900, and the level shifter 150. The display panel driving circuit may further include a touch sensor driver for driving touch sensors. The touch sensor driver is omitted from FIG. 12. The data driver 110 and the touch sensor driver may be integrated together in the drive integrated circuit (DIC).

The data driver 110 receives the pixel data of the input image from the controller 130 and outputs the data voltage Vdata. The data driver 110 may receive the gamma reference voltages and generate gamma compensation voltages for grayscales through a voltage division circuit. A gamma compensation voltage for each grayscale is supplied to a digital-to-analog converter ("DAC") disposed on the respective channels of the data driver 110.

The data driver 110 samples and latches the digital data received from the controller 130, and then enters the digital data into the DAC. The digital data includes the pixel data of the input image. The DAC converts the pixel data to the gamma compensation voltage and outputs the data voltage Vdata of the pixel data.

The gate driver 120 may be formed on the display panel 100 together with circuit elements of the display area AA and the wires. The gate driver 120 may be disposed in the non-display area NA on at least one of the right or left sides outside the display area AA in the display panel 100, or at least a portion thereof may be disposed within the display area AA.

The gate driver 120 may be disposed in the non-display areas NA on both sides of the display panel 100 with the display area AA of the display panel interposed therebetween, and may supply gate pulses from the both sides of the gate lines 103 in a double feeding method. The gate driver 120 may be disposed in at least one of the left and right non-display areas NA of the display panel 100 to supply the gate signal to the gate lines 103 in a single feeding method. The gate driver 120 may shift the pulses of the gate signals using a shift register or an edge trigger to sequentially supply these signals to the gate lines 103.

The gate driver 120 may include a first gate driver that supplies the first gate signal SCAN to the first gate lines, a second gate driver that supplies the second gate signal SENSE to the second gate lines, a third gate driver that supplies the third gate signal INIT to the third gate lines, a fourth gate driver that supplies the selection signal S1 to the fourth gate lines, and a fifth gate driver that supplies the second selection signal S3 to the fifth gate lines. Some of the gate drivers may be omitted depending on the embodiments of the pixel circuits described above.

The boosting voltage generator 900 outputs the boost high voltage VBH in the HDR mode and the boost low voltage VBL in the SDR mode under the control of the controller 130. The boosting voltage generator 900 may output the boost high voltage VBH and the boost low voltage VBL, the voltage levels of which may be varied by the controller 130 using the level shifter or the ADC.

The controller 130 receives an input image signal and a timing signal synchronized with the input image signal from the host system 300. The timing signal may include a vertical synchronization signal Vsync, a horizontal synchronization signal Hsync, and a data enable signal DE. Since a vertical period and a horizontal period may be known by counting the data enable signal DE, the vertical synchronization signal Vsync and the horizontal synchronization signal Hsync may be omitted. The horizontal synchronization signal Hsync and the data enable signal DE have a period of one horizontal period (1H).

The controller 130 generates a timing control signal for controlling the timing of the operations of each of the data driver 110, the gate driver 120, and the boosting voltage generator 900 based on the timing signals such as Vsync, Hsync, and DE received from the host system 300 to control the display panel driving circuit. The voltage level of the timing control signal output from the controller 130 may be shifted through the level shifter 150.

Figure 13:
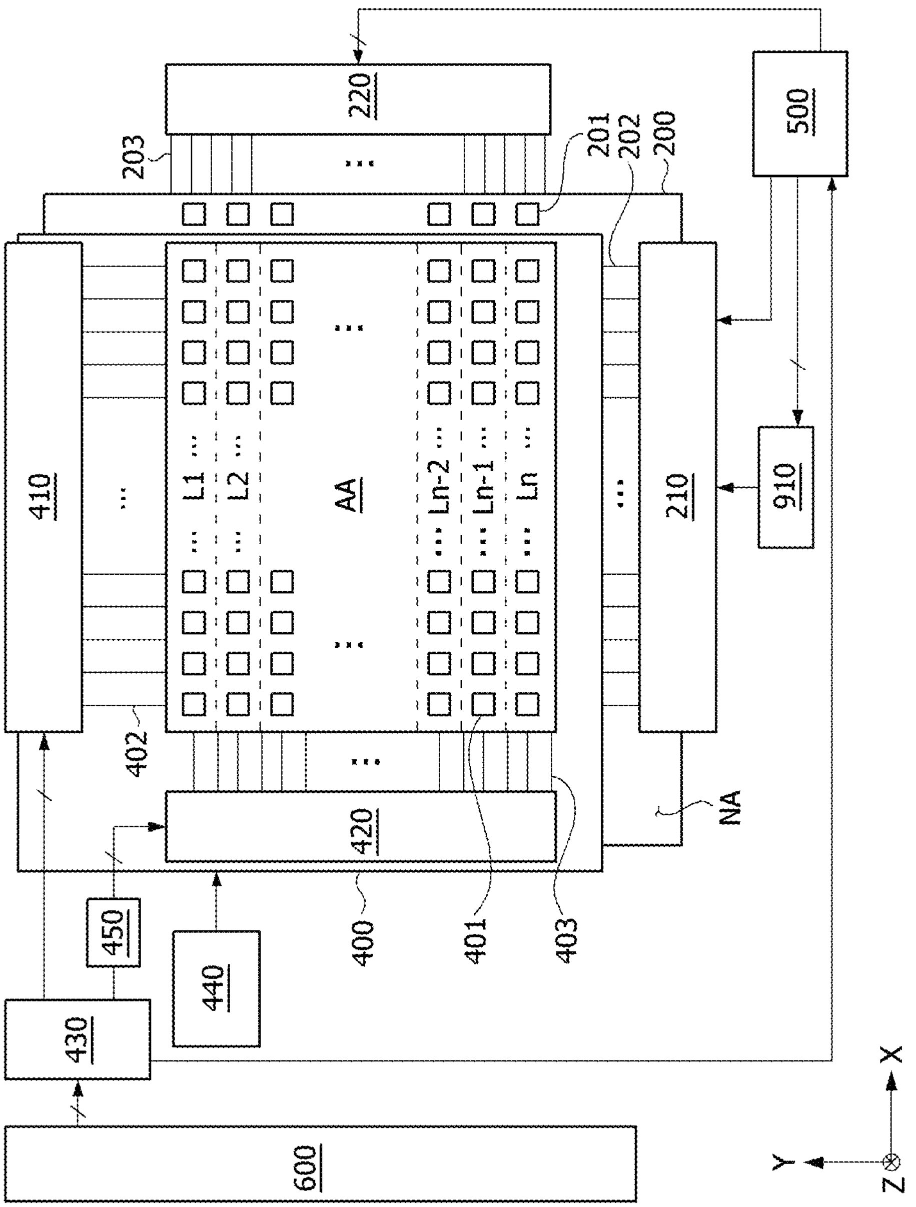
FIG. 13 is a block diagram illustrating a display device according to another embodiment of the present disclosure.
Figure 14:
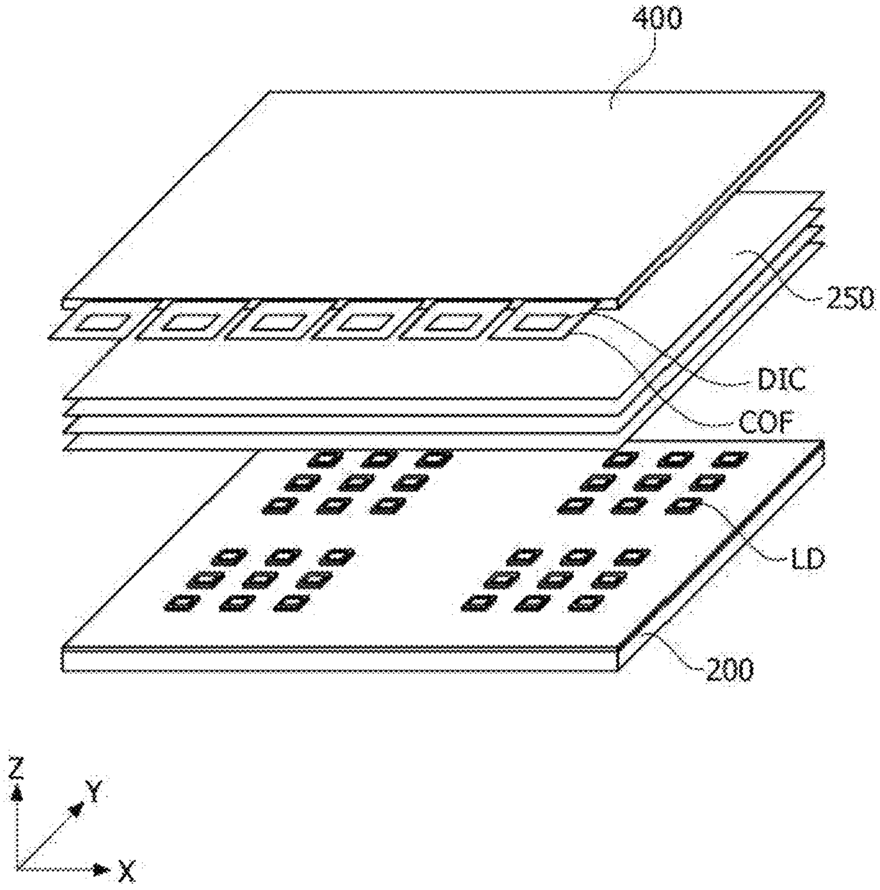
FIG. 14 is a perspective view illustrating a display panel and a backlight unit illustrated in FIG. 13 according to one embodiment of the present disclosure.

FIG. 13 is a block diagram illustrating a display device according to another embodiment of the present disclosure. FIG. 14 is a perspective view illustrating a display panel and a backlight unit illustrated in FIG. 13 according to one embodiment.

Referring to FIGS. 13 and 14, the display device includes a display panel 400, a display panel driving circuit for writing pixel data to display pixels 401 of the display panel 400, a backlight unit 200 for irradiating the display panel 400 with light emitted from light-emitting elements EL of local dimming pixels 201, and a backlight driving circuit for writing local dimming data to the local dimming pixels 201.

The display panel 400 may be a transmissive display panel including a liquid crystal layer without light-emitting elements. On the lower transparent substrate of the display panel 400, the data lines 402 and the gate lines 403 are intersected and the display pixels 401 connected to the data lines 402 and the gate lines 403 are disposed. A black matrix, a color filter, and a common electrode to which a common voltage is applied may be formed on the upper transparent substrate of the display panel 400. The common electrode may be formed on the upper transparent substrate in a vertical field driving mode such as TN (Twisted Nematic) mode and VA (Vertical Alignment) mode, and may be disposed together with the pixel electrodes of the display pixels 401 on the lower transparent substrate in horizontal field driving mode such as an IPS (In Plane Switching) mode and a FFS (Fringe Field Switching) mode.

A polarizer with orthogonal optical axes is attached to each of the upper and lower transparent substrates of the display panel 400. In each of the upper transparent substrate and the lower transparent substrate of the display panel 400, an alignment film for setting the pretilt angle of the liquid crystal is formed on the inner surface in contact with the liquid crystal layer.

Each of the display pixels 401 may be divided into a red sub-pixel, a green sub-pixel, and a blue sub-pixel for color implementation. Each of the display pixels 401 may further include a white sub-pixel. Each of the sub-pixels may include a switch element, for example, a TFT, that delivers a data voltage applied to the data lines 402 to the pixel electrode in response to the gate signal from the gate lines 403. Each sub-pixel uses liquid crystal molecules driven by an electric field between the pixel electrode and a common electrode to adjust the light transmittance of light that passes through the polarizer.

The display array AA includes a plurality of display pixel lines L1 to Ln. Each of the display pixel lines L1 to Ln includes one line of display pixels 401 arranged in the display area AA of the display panel 400 along a gate line direction (X-axis direction).

A power supply 440 receives an input voltage provided from a host system 600 and outputs voltages required to drive the display pixels 401, the display panel driving circuit, the local dimming pixels 201, and the backlight driving circuit of the display panel 400.

The display panel driving circuit writes the pixel data of the input image to the display pixels 401 of the display panel 400 under the control of a first controller 430. The display panel driving circuit includes a data driver 410 and a gate driver 420. The display panel driving circuit may further include a touch sensor driver for driving touch sensors.

The data driver 410 receives the pixel data of the input image provided as a digital signal from the first controller 430 and outputs the data voltage Vdata for supply to the data lines 402. The gate driver 420 outputs pulses of the gate signal to sequentially supply to the gate lines 403 of the display panel 400.

The first controller 430 receives an input image signal and a timing signal synchronized with the input image signal from the host system 600. The first controller 430 generates a data timing control signal for controlling the operation timing of the data driver 410 and a gate timing control signal for controlling the operation timing of the gate driver 420 to control the display panel driving circuit. The voltage level of the timing control signal output from the first controller 430 may be shifted through the level shifter 450.

The first controller 430 or a second controller 500 generates local dimming data from the pixel data of the input image. The first controller 430 or the second controller 500 may calculate the local dimming data for each block of the display panel 400 by downscaling the pixel data of the input image. The display area AA of the display panel 400 may be virtually divided into a plurality of blocks whose backlight luminance is independently controlled by local dimming. Each of the blocks of the display panel 400 includes a plurality of pixels. The local dimming data may be calculated, but is not limited to, as an average value of the pixel data in units of the blocks of the downscaled input image. The first controller 430 may transmit the pixel data of the input image or the local dimming data to the second controller 500.

The backlight unit 200 includes a plurality of data lines 202, a plurality of gate lines 203 intersecting the data lines 202, and a plurality of local dimming pixels 201. The backlight unit 200 may further include power lines commonly connected to the local dimming pixels 201.

Each of the local dimming pixels 201 includes a local dimming pixel circuit that drives a corresponding light-emitting element EL. The local dimming pixel circuit is connected to the data line 202, the plurality of gate lines 203, and the power lines. The gate lines 203 may include a first gate line to which the first gate signal SCAN is applied, a second gate line to which the second gate signal SENSE is applied, a third gate line to which the third gate signal INIT is applied, a fourth gate line to which the selection signal S1 is applied, and a fifth gate line to which the second selection signal S3 is applied. Some of the gate signals and selection signals may be omitted depending on the embodiments of the pixel circuits described above. The local dimming pixel circuit may be implemented as any one of the pixel circuits illustrated in FIGS. 1 to 9 described above.

The light-emitting elements EL of the backlight unit 200 may be disposed below the display panel 400, as illustrated in FIG. 14. The backlight unit 200 may further include light-emitting elements EL of the local dimming pixels 201 and one or more optical sheets 250 disposed between the display panels 400. The optical sheets 250 uniformly irradiate light from the light-emitting elements EL in a direction perpendicular to the face of the display panel 400.

The backlight driving circuit writes the local dimming data to the local dimming pixels 201 under the control of the second controller 500. The display panel driving circuit includes the data driver 210, the gate driver 220, and a boosting voltage generator 910.

The data driver 210 may convert the local dimming data received from the second controller 500 to a data voltage and supply it to the data lines 202 connected to the local dimming pixels 201.

The gate driver 220 may sequentially supply pulses of the gate signal to the gate lines 203. The gate driver 220 may include a first gate driver that supplies the first gate signal SCAN to the first gate lines, a second gate driver that supplies the second gate signal SENSE to the second gate lines, a third gate driver that supplies the third gate signal INIT to the third gate lines, a fourth gate driver that supplies the selection signal S1 to the fourth gate lines, and a fifth gate driver that supplies the second selection signal S3 to the fifth gate lines. Some of the gate drivers may be omitted depending on the embodiments of the pixel circuits described above.

The boosting voltage generator 910 outputs the boost high voltage VBH in the HDR mode and the boost low voltage VBL in the SDR mode under the control of the second controller 500. The boosting voltage generator 910 may output the boost high voltage VBH and the boost low voltage VBL whose voltage levels are variable by the second controller 500 using the level shifter or the ADC.

The second controller 500 may receive the local dimming data output from the first controller 430. In other embodiments, the second controller 500 may receive pixel data of the input image from the first controller 430 and generate local dimming data as a result of analyzing the pixel data of the input image. The second controller 500 may transmit the local dimming data to the data driver 210 and control the timing of the operations of the data driver 210, the gate driver 220, and the boosting voltage generator 910.

Figure 15:
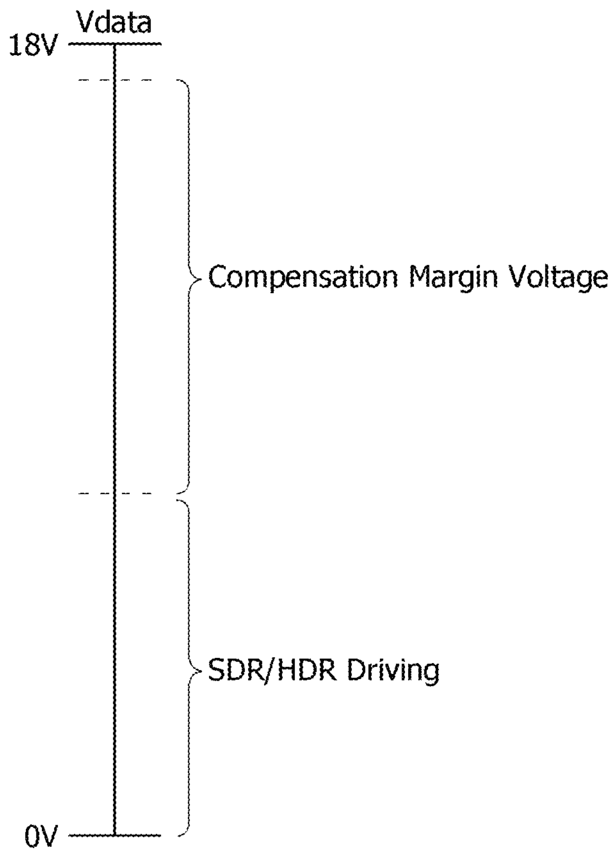
FIG. 15 is a diagram illustrating an example of the dynamic range of the data voltage output from a data driver according to one embodiment of the present disclosure.

FIG. 15 is a diagram illustrating an example of the dynamic range of the data voltage output from the data driver according to one embodiment.

Referring to FIG. 15, the dynamic range of the data voltage Vdata output from the data drivers 110, 210 and 410 may include the same SDR/HDR driving voltage range and compensation margin voltage range in HDR mode and SDR mode with the help of the boosting circuit embedded in the pixel circuit. The compensation margin voltage is the range of the compensation voltage that is added to the data voltage to compensate for the threshold voltage of the driving element DT sensed from the pixel when the threshold voltage is changed. In the dynamic range of the data voltage Vdata output from the data drivers 110, 210 and 410, since the dynamic range of the HDR mode is the same as the dynamic range of the SDR mode, the compensation margin voltage may be sufficiently secured to extend the lifetime of the display device without deteriorating the image quality.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display device according to one or more embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A pixel circuit comprising:

a power line that supplies a pixel driving voltage to the pixel circuit;

a light-emitting element;

a driving element connected to the light-emitting element and configured to regulate a current flowing to the light-emitting element according to a gate-source voltage of the driving element, the driving element including a first electrode, a gate electrode, and a second electrode; and a boosting circuit connected between the power line and the driving element and the boosting circuit connected to the driving element in series, the boosting circuit configured to supply the current to the first electrode of the driving element in each of a first mode and a second mode, wherein a first peak of the current supplied to the first electrode of the driving element in the second mode is greater than a second peak of the current supplied to the first electrode of the driving element in the first mode.

2. The pixel circuit of claim 1, wherein the light-emitting element includes an anode electrode that is electrically connected to the second electrode of the driving element and a cathode electrode that receives a cathode voltage, and wherein a first input voltage that is greater than the cathode voltage is applied to the boosting circuit through a first node.

3. The pixel circuit of claim 1, wherein the light-emitting element includes an anode electrode that is electrically connected to the boosting circuit and receives a first input voltage through a first node.

4. The pixel circuit of claim 1, wherein the boosting circuit includes:

a first switch element including a first electrode connected to a first node, a gate electrode connected to a third node, and a second electrode connected to the first electrode of the driving element;

a second switch element connected to a second node to which a second input voltage is applied and the third node, the second switch element configured to supply the second input voltage to the third node responsive to being turned on in response to a selection signal; and a capacitor connected to a node to which a boosting signal is applied and gate electrode of the first switch element and the second switch element at the third node, wherein a first input voltage is applied to the first node or a cathode electrode of the light-emitting element is connected to the first node, and the boosting signal is a boost low voltage during the first mode and is a boost high voltage that is greater than the boost low voltage during the second mode.

5. The pixel circuit of claim 4, further comprising:

a boosting voltage generator configured to output the boost high voltage and the boost low voltage;

a reference voltage line connected to the capacitor;

a reference voltage switch element configured to supply a reference voltage to the reference voltage line; and a sampling switch element configured to selectively connect the reference voltage line to one of an input node of an analog-to-digital converter, a floating node, and an output node of the boosting voltage generator.

6. The pixel circuit of claim 1, wherein the boosting circuit includes:

a first switch element including a first electrode connected to a first node, a gate electrode connected to a third node, and a second electrode connected to the first electrode of the driving element;

a second switch element connected to a second node to which a second input voltage is applied and a fourth node, the second switch element configured to supply the second input voltage to the fourth node responsive to being turned on in response to a first selection signal;

a first capacitor connected to a node to which a first boosting signal is applied and second switch element at the fourth node;

a third switch element connected to the gate electrode of the first switch element at the third node and the second switch element at the fourth node, the third switch element configured to apply a voltage of the fourth node to the third node responsive to being turned on in response to a second selection signal; and a second capacitor connected to a node to which a second boosting signal is applied and the gate electrode of the first switch element and the third switch element at the third node, wherein a first input voltage is applied to the first node or a cathode electrode of the light-emitting element is connected to the first node, and the second boosting signal is a boost low voltage during the first mode and is a boost high voltage that is greater than the boost low voltage during the second mode.

7. The pixel circuit of claim 6, wherein the second mode includes a primary boosting mode and a secondary boosting mode, wherein during the primary boosting mode the first boosting signal is the boost low voltage and during the secondary boosting mode the first boosting signal is the boost high voltage.

8. The pixel circuit of claim 1, further comprising:

a first pixel switch element connected to a data line to which a data voltage is applied and to the gate electrode of the driving element at a second pixel node, the first pixel switch element configured to apply the data voltage to the second pixel node responsive to being turned on in response to a first gate signal;

a second pixel switch element connected to a node to which a reference voltage is applied and to the second electrode of the driving element at a third pixel node, the second pixel switch element configured to apply the reference voltage to the third pixel node responsive to being turned on in response to a second gate signal; and a storage capacitor connected to the second pixel node and the third pixel node, wherein the first electrode of the driving element is connected to a first pixel node and the first pixel node is connected to the boosting circuit.

9. The pixel circuit of claim 8, further comprising:

a third pixel switch element connected to a node to which an initialization voltage is applied and to the gate electrode of the driving element and the first pixel switch element at the second pixel node, the third pixel switch element configured to apply the initialization voltage to the second pixel node responsive to being turned on in response to a third gate signal to.

10. A display device comprising:

a plurality of data lines;

a plurality of gate lines;

a plurality of pixels connected to the plurality of data lines and the plurality of gate lines, each of the plurality of pixels including:

a light-emitting element;

a driving element that is electrically connected to the light-emitting element and configured to control a current flowing to the light-emitting element, the driving element including a first electrode, a gate electrode, and a second electrode;

a data transistor including a first electrode connected to a data line from the plurality of data lines, a gate electrode connected to a gate line from the plurality of gate lines, and second electrode connected to the gate electrode of the driving element; and a boosting circuit connected to the first electrode of the driving element, the boosting circuit including:

a first switch element including a first electrode connected to a first node to which a first input voltage is applied, a gate electrode connected to a third node, and a second electrode connected to the first electrode of the driving element;

a second switch element electrically connected to a second node to which a second input voltage is applied and is configured to be electrically connected to the gate electrode of the first switch element at the third node, the second switch element configured to supply the second input voltage to the third node responsive to a first selection signal; and a first capacitor connected to a node to which a first boosting signal is applied and is electrically connected to the gate electrode of the first switch element and the second switch element at the third node, wherein during a first mode of the display device the first boosting signal is a first boost voltage and a magnitude of the current supplied to the first electrode of the driving element is a first value and during a second mode of the display device the first boosting signal is a second boost voltage that is greater than the first boost voltage and the magnitude of the current supplied to the first electrode of the driving element is a second value that is greater than the first value.

11. The display device of claim 10, further comprising:

a display panel including a plurality of data lines to which a data voltage is applied, a plurality of gate lines to which a gate signal and a selection signal are applied, a plurality of power lines, and the plurality of pixels;

a data driver configured to receive pixel data from an input image and output the data voltage;

a gate driver configured to output the gate signal and the selection signal; and a boosting voltage generator configured to output the first boosting signal.

12. The display device of claim 10, further comprising:

a display panel in which pixel data of an input image is written; and a backlight unit configured to irradiate light to the display panel, the backlight unit including:

a plurality of data lines to which a data voltage is applied;

a plurality of gate lines to which a gate signal and a selection signal are applied;

a plurality of power lines; and the plurality of pixels.

13. The display device of claim 10, wherein the second switch element includes a first electrode that is connected to the second node, a second electrode that is connected to the gate electrode of the first switch element and the first capacitor at the third node, and a gate electrode that receives the first selection signal.

14. The display device of claim 10, wherein the second switch element includes a first electrode that is connected to the second node, a second electrode that is connected to a fourth node and the first capacitor, and a gate electrode that receives the first selection signal, wherein the boosting circuit further comprises:

a third switch element including a first electrode that is connected to the first capacitor and the second electrode of the second switch element at the fourth node, a second electrode that is connected to the gate electrode of the driving element at the third node, and a gate electrode that receives a second selection signal, the third switch element configured to electrically connect the second switch element to the third node and apply a voltage of the fourth node to the third node in response to the second selection signal;

a second capacitor connected to a node to which a second boosting signal is applied and the gate electrode of the first switch element and the second electrode of the third switch element at the third node.

15. The display device of claim 14, wherein the first boosting signal and the second boosting signal are a first boost voltage during the first mode and a second boost voltage that is greater than the first boost voltage during the second mode.

16. The display device of claim 15, wherein the second mode includes a primary boosting mode and a secondary boosting mode, wherein during the primary boosting mode the first boosting signal is the first boost voltage and during the secondary boosting mode the first boosting signal is the second boost voltage.

17. The display device of claim 16, further comprising:

a boosting voltage generator configured to output the second boost voltage and the first boost voltage;

a reference voltage line connected to the first capacitor;

a reference voltage switch element configured to supply a reference voltage to the reference voltage line; and a sampling switch element configured to selectively connect the reference voltage line to one of an input node of an analog-to-digital converter, a floating node, and an output node of the boosting voltage generator.

18. The display device of claim 10, wherein an anode electrode of the light-emitting element is connected to the second electrode of the driving element.

19. The display device of claim 10, wherein a cathode electrode of the light-emitting element is connected to the driving element.

20. The display device of claim 10, further comprising:

a first pixel switch element connected to a data line to which a data voltage is applied and to the gate electrode of the driving element at a second pixel node, the first pixel switch element configured to apply the data voltage to the second pixel node responsive to a first gate signal;

a second pixel switch element connected to a node to which a reference voltage is applied and to the second electrode of the driving element at a third pixel node, the second pixel switch element configured to apply the reference voltage to the third pixel node responsive to a second gate signal; and a storage capacitor connected to the second pixel node and the third pixel node, wherein the first electrode of the driving element is connected to a first pixel node and the first pixel node is connected to the boosting circuit.

* * * * *